US012013758B2

United States Patent
Ben Dayan et al.

(10) Patent No.: US 12,013,758 B2
(45) Date of Patent: Jun. 18, 2024

(54) METHODS AND SYSTEMS FOR POWER FAILURE RESISTANCE FOR A DISTRIBUTED STORAGE SYSTEM

(71) Applicant: Weka.IO Ltd, Tel Aviv (IL)

(72) Inventors: Maor Ben Dayan, Tel Aviv (IL); Omri Palmon, Tel Aviv (IL); Liran Zvibel, Tel Aviv (IL); Kanael Arditti, Tel Aviv (IL)

(73) Assignee: Weka.IO Ltd. (IL)

( * ) Notice: Subject to any disclaimer, the term of this patent is extended or adjusted under 35 U.S.C. 154(b) by 0 days.

(21) Appl. No.: 18/087,247

(22) Filed: Dec. 22, 2022

(65) Prior Publication Data

US 2023/0127166 A1  Apr. 27, 2023

Related U.S. Application Data

(63) Continuation of application No. 16/122,447, filed on Sep. 5, 2018, now Pat. No. 11,561,860.

(60) Provisional application No. 62/585,186, filed on Nov. 13, 2017.

(51) Int. Cl.
    *G06F 11/14*  (2006.01)
    *G06F 3/06*   (2006.01)

(52) U.S. Cl.
    CPC .......... *G06F 11/142* (2013.01); *G06F 3/0619* (2013.01); *G06F 3/0632* (2013.01); *G06F 3/0652* (2013.01); *G06F 3/067* (2013.01)

(58) Field of Classification Search
    CPC ......... G06F 2212/1052; G06F 12/1475; G06F 2201/815; G06F 3/0619; G06F 3/0632; G06F 3/0652; G06F 3/067; G06F 11/142; G06F 11/106; G06F 11/1464; G06F 11/3006; G06F 11/3419; G06F 11/1471
    See application file for complete search history.

(56) References Cited

U.S. PATENT DOCUMENTS

| 5,799,200 | A   |   | 8/1998  | Brant et al. |
| 6,487,636 | B1  |   | 11/2002 | Dolphin et al. |
| 7,051,155 | B2  | * | 5/2006  | Talagala ............... G06F 11/1076 714/E11.034 |
| 7,447,839 | B2  |   | 4/2008  | Uppala |
| 7,519,628 | B1  |   | 4/2009  | LeVerett |
| 7,681,072 | B1  |   | 3/2010  | Gibson et al. |
| 7,793,146 | B1  |   | 9/2010  | Gibson et al. |
| 7,877,511 | B1  |   | 1/2011  | Berger et al. |
| 8,086,911 | B1  | * | 12/2011 | Taylor .................... G06F 11/106 714/6.24 |
| 8,099,623 | B1  |   | 1/2012  | Li et al. |

(Continued)

OTHER PUBLICATIONS

Chinese Office Action with search report Appln No. 2018800863695 dated Mar. 17, 2023.

(Continued)

*Primary Examiner* — Matthew M Kim
*Assistant Examiner* — Matthew N Putaraksa
(74) *Attorney, Agent, or Firm* — McAndrews, Held & Malloy, Ltd.

(57) ABSTRACT

A plurality of computing devices are communicatively coupled to each other via a network, and each of the plurality of computing devices is operably coupled to one or more of a plurality of storage devices. One or more of the computing devices and/or the storage devices may be used to rebuild data that may be lost due to a power failure.

20 Claims, 6 Drawing Sheets

(56) References Cited

U.S. PATENT DOCUMENTS

| | | | |
|---|---|---|---|
| 8,225,006 B1* | 7/2012 | Karamcheti | G06F 11/108 714/6.21 |
| 8,347,010 B1 | 1/2013 | Radovanovic | |
| 8,645,749 B2 | 2/2014 | Reche | |
| 8,918,478 B2 | 12/2014 | Ozzie et al. | |
| 9,003,106 B1* | 4/2015 | Clark | G06F 12/1416 711/103 |
| 9,063,854 B1* | 6/2015 | Subramanian | G06F 11/14 |
| 9,087,012 B1 | 7/2015 | Hayes et al. | |
| 9,292,389 B2* | 3/2016 | Schirripa | G06F 11/1092 |
| 9,448,887 B1 | 9/2016 | Ben Dayan et al. | |
| 9,747,162 B2 | 8/2017 | Ben Dayan et al. | |
| 11,044,312 B2* | 6/2021 | Diaconu | H04L 67/1097 |
| 2002/0103814 A1* | 8/2002 | Duvillier | G06F 16/24 |
| 2003/0036882 A1* | 2/2003 | Harper | G06F 11/2035 702/186 |
| 2003/0115218 A1 | 6/2003 | Bobbitt et al. | |
| 2004/0098415 A1 | 5/2004 | Bone et al. | |
| 2005/0289152 A1 | 12/2005 | Earl et al. | |
| 2006/0075289 A1* | 4/2006 | Forrer | G06F 11/0727 714/6.22 |
| 2007/0061542 A1 | 3/2007 | Uppala | |
| 2007/0143261 A1 | 6/2007 | Uppala | |
| 2007/0143311 A1 | 6/2007 | Uppala | |
| 2008/0172428 A1 | 7/2008 | Stokes | |
| 2009/0031099 A1 | 1/2009 | Sartore | |
| 2009/0119541 A1 | 5/2009 | Inoue et al. | |
| 2009/0172273 A1* | 7/2009 | Piszczek | G06F 11/1092 711/E12.019 |
| 2010/0199125 A1 | 8/2010 | Reche | |
| 2011/0191522 A1* | 8/2011 | Condict | G06F 12/123 711/E12.001 |
| 2011/0213994 A1 | 9/2011 | Thereska et al. | |
| 2012/0079258 A1 | 3/2012 | Schneider et al. | |
| 2012/0210095 A1 | 8/2012 | Nellans et al. | |
| 2012/0221879 A1 | 8/2012 | Hutchison et al. | |
| 2013/0013874 A1* | 1/2013 | Graefe | G06F 11/1469 711/E12.103 |
| 2014/0244897 A1 | 8/2014 | Goss et al. | |
| 2014/0281280 A1 | 9/2014 | Goss et al. | |
| 2015/0248366 A1 | 9/2015 | Bergsten et al. | |
| 2015/0254088 A1 | 9/2015 | Chou et al. | |
| 2015/0355971 A1 | 12/2015 | Becker-Szendy et al. | |
| 2016/0117133 A1* | 4/2016 | Blaum | G06F 3/0604 711/114 |
| 2016/0017962 A1 | 6/2016 | Beck et al. | |
| 2016/0170833 A1* | 6/2016 | Segura | G06F 11/1088 714/6.23 |
| 2016/0179621 A1 | 6/2016 | Schirripa et al. | |
| 2016/0246677 A1 | 8/2016 | Sangamkar et al. | |
| 2016/0277497 A1* | 9/2016 | Bannister | H04L 67/1097 |
| 2017/0329667 A1* | 11/2017 | Hirano | H03M 13/152 |
| 2018/0253255 A1* | 9/2018 | Jain | G06F 3/0673 |
| 2018/0341561 A1* | 11/2018 | Hutchison | G06F 11/1092 |
| 2019/0082010 A1* | 3/2019 | Friedman | G06F 11/1076 |
| 2020/0125265 A1* | 4/2020 | Schneider | G06F 3/061 |

OTHER PUBLICATIONS

Int'l Search Report and Written Opinion Appln No. PCT/IB2016/001177 dated Dec. 2, 2016.
Int'l Preliminary Report on Patentability Appln No. PCT/IB2016/001177 dated Mar. 8, 2018.
Int'l Search Report and Written Opinion Appln No. PCT/IB2016/000996 dated Oct. 20, 2016.
Int'l Preliminary Report on Patentability Appln No. PCT/IB2016/000996 dated Jan. 2, 2018.
Extended European Search Report Appln No. 16817312.8-1217 dated Oct. 25, 2018.
Int'l Search Report and Written Opinion Appln No. PCT/IB2018/001256 dated Mar. 22, 2019 (14 pgs.).
Int'l Preliminary Report on Patentability Appln No. PCT/IB2018/001256 dated May 28, 2020.
European Office Communication with supplemental Search Report Appln No. 18875600.1 dated Jul. 26, 2021.
Chinese Office Action with search report Appln No. 2018800863695 dated Sep. 26, 2023.

* cited by examiner

METHODS AND SYSTEMS FOR POWER FAILURE RESISTANCE FOR A DISTRIBUTED STORAGE SYSTEM

PRIORITY CLAIM

This application is a continuation of U.S. patent application Ser. No. 16/122,447, filed Sep. 5, 2018, which claims priority to U.S. provisional patent application 62/585,186 filed on Nov. 13, 2017. The documents listed above are hereby incorporated herein by reference in their entirety.

INCORPORATION BY REFERENCE

U.S. patent application Ser. No. 15/243,519 titled "Distributed Erasure Coded Virtual File System" is hereby incorporated herein by reference in its entirety.

BACKGROUND

Limitations and disadvantages of conventional approaches to data storage will become apparent to one of skill in the art, through comparison of such approaches with some aspects of the present method and system set forth in the remainder of this disclosure with reference to the drawings.

BRIEF SUMMARY

Methods and systems are provided for power failure resistance in a distributed storage system substantially as illustrated by and/or described in connection with at least one of the figures, as set forth more completely in the claims.

DETAILED DESCRIPTION

Traditionally, filesystems use a centralized control over the metadata structure (e.g., directories, files, attributes, file contents). If a local filesystem is accessible from a single server and that server fails, the filesystem's data may be lost if as there is no further protection. To add protection, some filesystems (e.g., as provided by NetApp) have used one or more pairs of controllers in an active-passive manner to replicate the metadata across two or more computers. Other solutions have used multiple metadata servers in a clustered way (e.g., as provided by IBM GPFS, Dell EMC Isilon, Lustre, etc.). However, because the number of metadata servers in a traditional clustered system is limited to small numbers, such systems are unable to scale.

The systems in this disclosure are applicable to small clusters and can also scale to many, many thousands of nodes. An example embodiment is discussed regarding non-volatile memory (NVM), for example, flash memory that comes in the form of a solid-state drive (SSD). The NVM may be divided into 4 kB "blocks" and 128 MB "chunks." "Extents" may be stored in volatile memory such as, for example, RAM, for fast access, and may be backed up by NVM storage as well. An extent may store pointers for blocks, e.g., 256 pointers to 1 MB of data stored in blocks. In other embodiments, larger or smaller memory divisions may also be used. Metadata functionality in this disclosure may be effectively spread across many servers. For example, in cases of "hot spots" where a large load is targeted at a specific portion of the filesystem's namespace, this load can be distributed across a plurality of nodes.

Figure 1:
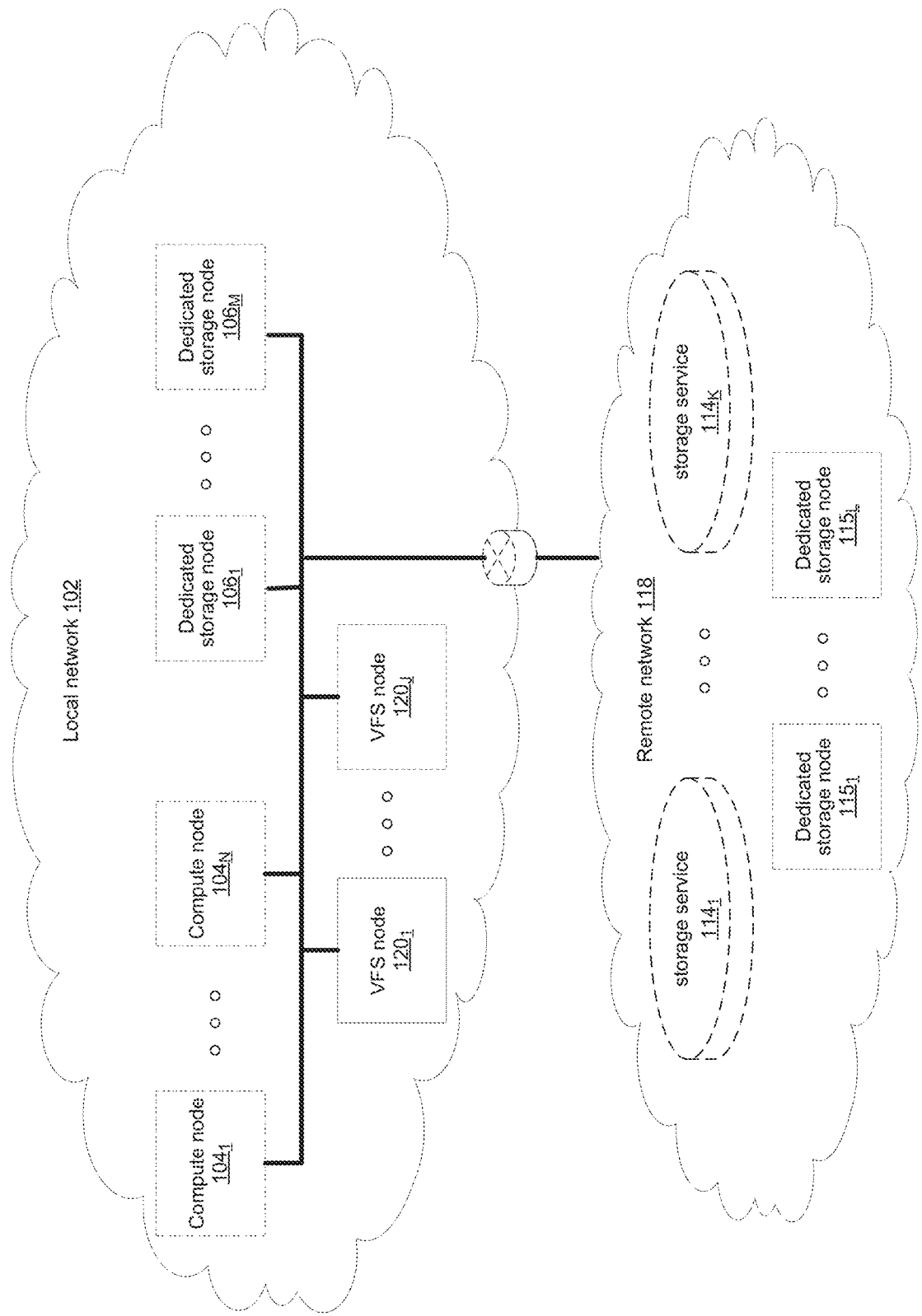
FIG. 1 illustrates various example configurations of a virtual file system in accordance with aspects of this disclosure.

FIG. 1 illustrates various example configurations of a virtual file system (VFS) in accordance with aspects of this disclosure. Shown in FIG. 1 is a local area network (LAN) 102 comprising one or more VFS nodes 120 (indexed by integers from 1 to J, for j≥1), and optionally comprising (indicated by dashed lines): one or more dedicated storage nodes 106 (indexed by integers from 1 to M, for M≥1), one or more compute nodes 104 (indexed by integers from 1 to N, for N≥1), and/or an edge router that connects the LAN 102 to a remote network 118. The remote network 118 optionally comprises one or more storage services 114 (indexed by integers from 1 to K, for K≥1), and/or one or more dedicated storage nodes 115 (indexed by integers from 1 to L, for L≥1).

Each VFS node $120_j$ (j an integer, where 1≤j≤J) is a networked computing device (e.g., a server, personal computer, or the like) that comprises circuitry for running VFS processes and, optionally, client processes (either directly on an operating system of the device $104_n$ and/or in one or more virtual machines running in the device $104_n$).

The compute nodes 104 are networked devices that may run a VFS frontend without a VFS backend. A compute node 104 may run VFS frontend by taking an SR-IOV into the NIC and consuming a complete processor core. Alternatively, the compute node 104 may run the VFS frontend by routing the networking through a Linux kernel networking stack and using kernel process scheduling, thus not having the requirement of a full core. This is useful if a user does not want to allocate a complete core for the VFS or if the networking hardware is incompatible with the VFS requirements.

Figure 2:
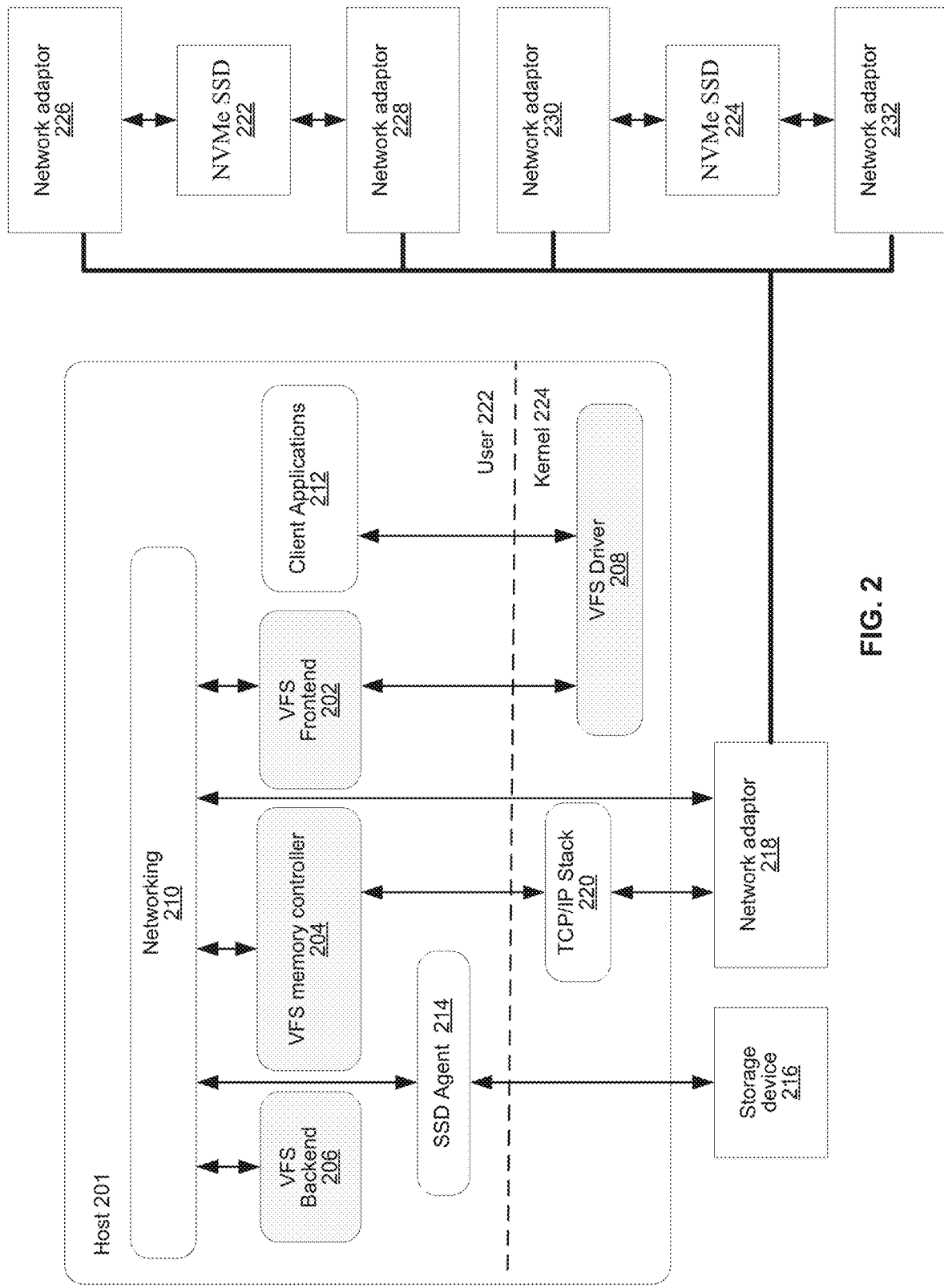
FIG. 2 illustrates an example configuration of a virtual file system node in accordance with aspects of this disclosure.

FIG. 2 illustrates an example configuration of a VFS node in accordance with aspects of this disclosure. A VFS node comprises a VFS frontend 202 and driver 208, a VFS memory controller 204, a VFS backend 206, and a VFS SSD agent 214. As used in this disclosure, a "VFS process" is a process that implements one or more of: the VFS frontend 202, the VFS memory controller 204, the VFS backend 206, and the VFS SSD agent 214. Thus, in an example implementation, resources (e.g., processing and memory resources) of the VFS node may be shared among client processes and VFS processes. The processes of the VFS may be configured to demand relatively small amounts of the resources to minimize the impact on the performance of the client applications. The VFS frontend 202, the VFS memory controller 204, and/or the VFS backend 206 and/or the VFS SSD agent 214 may run on a processor of the host 201 or on a processor of the network adaptor 218. For a multi-core processor, different VFS process may run on different cores, and may run a different subset of the services. From the perspective of the client process(es) 212, the interface with the virtual file system is independent of the particular physical machine(s) on which the VFS process(es) are running. Client processes only require driver 208 and frontend 202 to be present in order to serve them.

The VFS node may be implemented as a single tenant server (e.g., bare-metal) running directly on an operating system or as a virtual machine (VM) and/or container (e.g., a Linux container (LXC)) within a bare-metal server. The VFS may run within an LXC container as a VM environment. Thus, inside the VM, the only thing that may run is the LXC container comprising the VFS. In a classic bare-metal environment, there are user-space applications and the VFS runs in an LXC container. If the server is running other containerized applications, the VFS may run inside an LXC container that is outside the management scope of the container deployment environment (e.g. Docker).

The VFS node may be serviced by an operating system and/or a virtual machine monitor (VMM) (e.g., a hypervisor). The VMM may be used to create and run the VFS node on a host 201. Multiple cores may reside inside the single LXC container running the VFS, and the VFS may run on a single host 201 using a single Linux kernel. Therefore, a single host 201 may comprise multiple VFS frontends 202, multiple VFS memory controllers 204, multiple VFS backends 206, and/or one or more VFS drivers 208. A VFS driver 208 may run in kernel space outside the scope of the LXC container.

A single root input/output virtualization (SR-IOV) PCIe virtual function may be used to run the networking stack 210 in user space 222. SR-IOV allows the isolation of PCI Express, such that a single physical PCI Express can be shared on a virtual environment and different virtual functions may be offered to different virtual components on a single physical server machine. The I/O stack 210 enables the VFS node to bypasses the standard TCP/IP stack 220 and communicate directly with the network adapter 218. A Portable Operating System Interface for uniX (POSIX) VFS functionality may be provided through lockless queues to the VFS driver 208. SR-IOV or full PCIe physical function address may also be used to run non-volatile memory express (NVMe) driver 214 in user space 222, thus bypassing the Linux IO stack completely. NVMe may be used to access non-volatile storage media 216 attached via a PCI Express (PCIe) bus. The non-volatile storage media 220 may be, for example, flash memory that comes in the form of a solid-state drive (SSD) or Storage Class Memory (SCM) that may come in the form of an SSD or a memory module (DIMM). Other example may include storage class memory technologies such as 3D-XPoint.

The SSD may be implemented as a networked device by coupling the physical SSD 216 with the SSD agent 214 and networking 210. Alternatively, the SSD may be implemented as a network-attached NVMe SSD 222 or 224 by using a network protocol such as NVMe-oF (NVMe over Fabrics). NVMe-oF may allow access to the NVMe device using redundant network links, thereby providing a higher level or resiliency. Network adapters 226, 228, 230 and 232 may comprise hardware acceleration for connection to the NVMe SSD 222 and 224 to transform them into networked NVMe-oF devices without the use of a server. The NVMe SSDs 222 and 224 may each comprise two physical ports, and all the data may be accessed through either of these ports.

Each client process/application 212 may run directly on an operating system or may run in a virtual machine and/or container serviced by the operating system and/or hypervisor. A client process 212 may read data from storage and/or write data to storage in the course of performing its primary function. The primary function of a client process 212, however, is not storage-related (i.e., the process is only concerned that its data is reliably stored and is retrievable when needed, and not concerned with where, when, or how the data is stored). Example applications which give rise to such processes include: email servers, web servers, office productivity applications, customer relationship management (CRM), animated video rendering, genomics calculation, chip design, software builds, and enterprise resource planning (ERP).

A client application 212 may make a system call to the kernel 224 which communicates with the VFS driver 208. The VFS driver 208 puts a corresponding request on a queue of the VFS frontend 202. If several VFS frontends exist, the driver may load balance accesses to the different frontends, making sure a single file/directory is always accessed via the same frontend. This may be done by "sharding" the frontend based on the ID of the file or directory. The VFS frontend 202 provides an interface for routing file system requests to an appropriate VFS backend based on the bucket that is responsible for that operation. The appropriate VFS backend may be on the same host or it may be on another host.

The VFS backend 206 hosts several buckets, each one of them services the file system requests that it receives and carries out tasks to otherwise manage the virtual file system (e.g., load balancing, journaling, maintaining metadata, caching, moving of data between tiers, removing stale data, correcting corrupted data, etc.)

The VFS SSD agent 214 handles interactions with a respective storage device 216. This may include, for example, translating addresses, and generating the commands that are issued to the storage device (e.g., on a SATA, SAS, PCIe, or other suitable bus). Thus, the VFS SSD agent 214 operates as an intermediary between a storage device 216 and the VFS backend 206 of the virtual file system. The SSD agent 214 could also communicate with a standard network storage device supporting a standard protocol such as NVMe-oF (NVMe over Fabrics).

Figure 3:
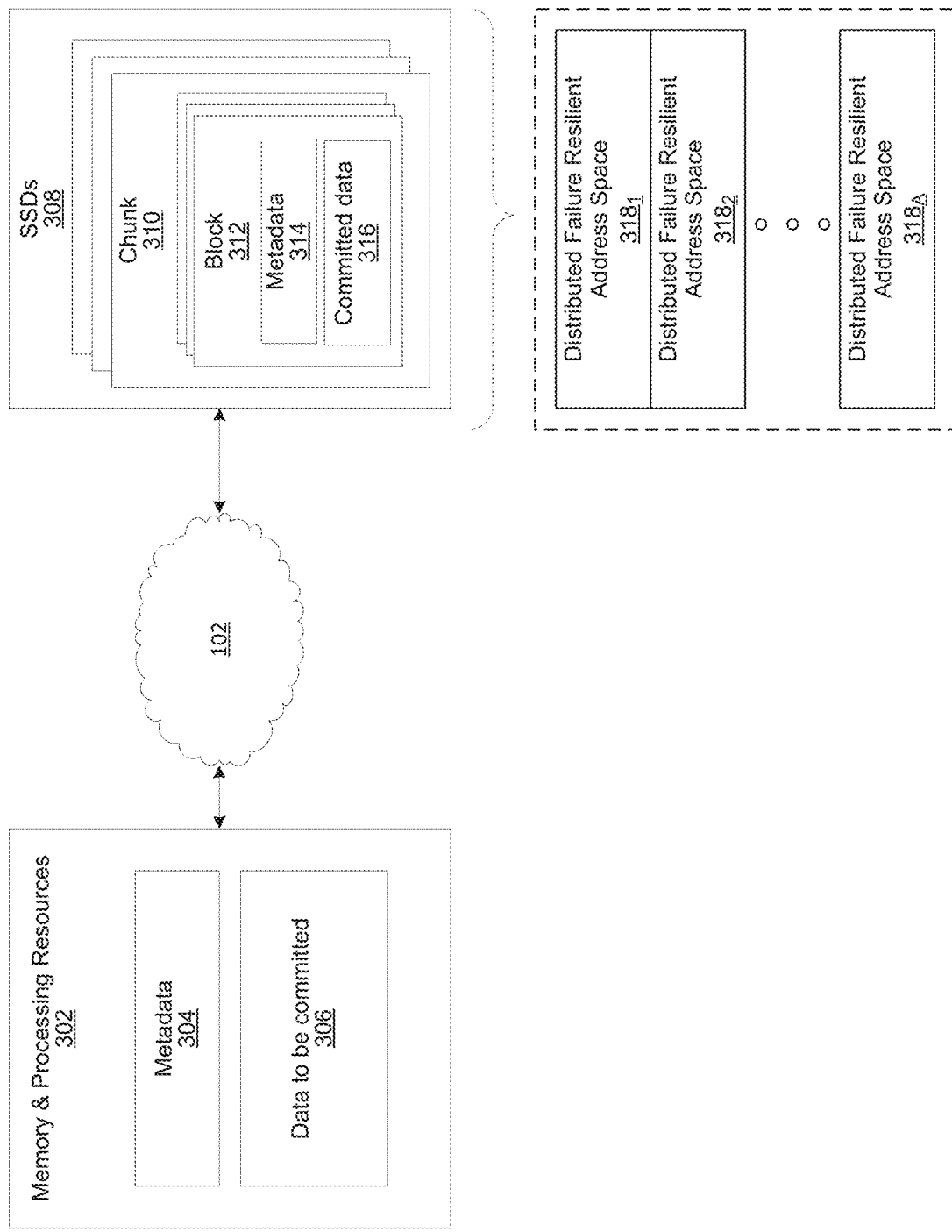
FIG. 3 illustrates another representation of a virtual file system in accordance with an example implementation of this disclosure.

FIG. 3 illustrates another representation of a virtual file system in accordance with an example implementation of this disclosure. In FIG. 3, the element 302 represents memory resources (e.g., DRAM and/or other short-term memory) and processing (e.g., x86 processor(s), ARM processor(s), NICs, ASICs, FPGAs, and/or the like) resources of various node(s) (compute, storage, and/or VFS) on which resides a virtual file system, such as described regarding FIG. 2 above. The element 308 represents the one or more physical storage devices 216 which provide the long term storage of the virtual file system.

As shown in FIG. 3, the physical storage is organized into a plurality of distributed failure resilient address spaces (DFRASs) 318. Each of which comprises a plurality of chunks 310, which in turn comprises a plurality of blocks 312. The organization of blocks 312 into chunks 310 is only a convenience in some implementations and may not be done in all implementations. Each block 312 stores committed data 316 (which may take on various states, discussed below) and/or metadata 314 that describes or references committed data 316.

The organization of the storage 308 into a plurality of DFRASs enables high performance parallel commits from many—perhaps all—of the nodes of the virtual file system (e.g., all nodes $104_1$-$104_N$, $106_1$-$106_M$, and $120_1$-$120_J$ of FIG. 1 may perform concurrent commits in parallel). In an example implementation, each of the nodes of the virtual file system may own a respective one or more of the plurality of DFRAS and have exclusive read/commit access to the DFRASs that it owns.

Each bucket owns a DFRAS, and thus does not need to coordinate with any other node when writing to it. Each bucket may build stripes across many different chunks on many different SSDs, thus each bucket with its DFRAS can choose what "chunk stripe" to write to currently based on many parameters, and there is no coordination required in order to do so once the chunks are allocated to that bucket. All buckets can effectively write to all SSDs without any need to coordinate.

Each DFRAS being owned and accessible by only its owner bucket that runs on a specific node allows each of the nodes of the VFS to control a portion of the storage 308 without having to coordinate with any other nodes (except during [re]assignment of the buckets holding the DFRASs during initialization or after a node failure, for example, which may be performed asynchronously to actual reads/commits to storage 308). Thus, in such an implementation, each node may read/commit to its buckets' DFRASs independently of what the other nodes are doing, with no requirement to reach any consensus when reading and committing to storage 308. Furthermore, in the event of a failure of a particular node, the fact the particular node owns a plurality of buckets permits more intelligent and efficient redistribution of its workload to other nodes (rather the whole workload having to be assigned to a single node, which may create a "hot spot"). In this regard, in some implementations the number of buckets may be large relative to the number of nodes in the system such that any one bucket may be a relatively small load to place on another node. This permits fine grained redistribution of the load of a failed node according to the capabilities and capacity of the other nodes (e.g., nodes with more capabilities and capacity may be given a higher percentage of the failed nodes buckets).

To permit such operation, metadata may be maintained that maps each bucket to its current owning node such that reads and commits to storage 308 can be redirected to the appropriate node.

Load distribution is possible because the entire filesystem metadata space (e.g., directory, file attributes, content range in the file, etc.) can be broken (e.g., chopped or sharded) into small, uniform pieces (e.g., "shards"). For example, a large system with 30 k servers could chop the metadata space into 128 k or 256 k shards.

Each such metadata shard may be maintained in a "bucket." Each VFS node may have responsibility over several buckets. When a bucket is serving metadata shards on a given backend, the bucket is considered "active" or the "leader" of that bucket. Typically, there are many more buckets than VFS nodes. For example, a small system with 6 nodes could have 120 buckets, and a larger system with 1,000 nodes could have 8 k buckets.

Each bucket may be active on a small set of nodes, typically 5 nodes that that form a penta-group for that bucket. The cluster configuration keeps all participating nodes up-to-date regarding the penta-group assignment for each bucket.

Each penta-group monitors itself. For example, if the cluster has 10 k servers, and each server has 6 buckets, each server will only need to talk with 30 different servers to maintain the status of its buckets (6 buckets will have 6 penta-groups, so 6*5=30). This is a much smaller number than if a centralized entity had to monitor all nodes and keep a cluster-wide state. The use of penta-groups allows performance to scale with bigger clusters, as nodes do not perform more work when the cluster size increases. This could pose a disadvantage that in a "dumb" mode a small cluster could actually generate more communication than there are physical nodes, but this disadvantage is overcome by sending just a single heartbeat between two servers with all the buckets they share (as the cluster grows this will change to just one bucket, but if you have a small 5 server cluster then it will just include all the buckets in all messages and each server will just talk with the other 4). The penta-groups may decide (i.e., reach consensus) using an algorithm that resembles the Raft consensus algorithm.

Each bucket may have a group of compute nodes that can run it. For example, five VFS nodes can run one bucket. However, only one of the nodes in the group is the controller/leader at any given moment. Further, no two buckets share the same group, for large enough clusters. If there are only 5 or 6 nodes in the cluster, most buckets may share backends. In a reasonably large cluster there many distinct node groups. For example, with 26 nodes, there are more than 64,000 (26!/5!*(26-5)!) possible five-node groups (i.e., penta-groups).

All nodes in a group know and agree (i.e., reach consensus) on which node is the actual active controller (i.e., leader) of that bucket. A node accessing the bucket may remember ("cache") the last node that was the leader for that bucket out of the (e.g., five) members of a group. If it accesses the bucket leader, the bucket leader performs the requested operation. If it accesses a node that is not the current leader, that node indicates the leader to "redirect" the access. If there is a timeout accessing the cached leader node, the contacting node may try a different node of the same penta-group. All the nodes in the cluster share common "configuration" of the cluster, which allows the nodes to know which server may run each bucket.

Each bucket may have a load/usage value that indicates how heavily the bucket is being used by applications running on the filesystem. For example, a server node with 11 lightly used buckets may receive another bucket of metadata to run before a server with 9 heavily used buckets, even though there will be an imbalance in the number of buckets used. Load value may be determined according to average response latencies, number of concurrently run operations, memory consumed or other metrics.

Redistribution may also occur even when a VFS node does not fail. If the system identifies that one node is busier than the others based on the tracked load metrics, the system can move (i.e., "fail over") one of its buckets to another server that is less busy. However, before actually relocating a bucket to a different host, load balancing may be achieved by diverting writes and reads. Because each write may end up on a different group of nodes, decided by the DFRAS, a node with a higher load may not be selected to be in a stripe to which data is being written. The system may also opt to not serve reads from a highly loaded node. For example, a "degraded mode read" may be performed, wherein a block in the highly loaded node is reconstructed from the other blocks of the same stripe. A degraded mode read is a read that is performed via the rest of the nodes in the same stripe, and the data is reconstructed via the failure protection. A degraded mode read may be performed when the read latency is too high, as the initiator of the read may assume that that node is down. If the load is high enough to create higher read latencies, the cluster may revert to reading that data from the other nodes and reconstructing the needed data using the degraded mode read.

Each bucket manages its own distributed erasure coding instance (i.e., DFRAS 318) and does not need to cooperate with other buckets to perform read or write operations. There are potentially thousands of concurrent, distributed erasure coding instances working concurrently, each for the different bucket. This is an integral part of scaling performance, as it effectively allows any large filesystem to be divided into independent pieces that do not need to be coordinated, thus providing high performance regardless of the scale.

Each bucket handles all the file systems operations that fall into its shard. For example, the directory structure, file attributes, and file data ranges will fall into a particular bucket's jurisdiction.

An operation done from any frontend starts by finding out what bucket owns that operation. Then the backend leader, and the node, for that bucket is determined. This determination may be performed by trying the last-known leader. If the last-known leader is not the current leader, that node may know which node is the current leader. If the last-known leader is not part of the bucket's penta-group anymore, that backend will let the front end know that it should go back to the configuration to find a member of the bucket's penta-group. The distribution of operations allows complex operations to be handled by a plurality of servers, rather than by a single computer in a standard system.

If the cluster of size is small (e.g., 5) and penta-groups are used, there will be buckets that share the same group. As the cluster size grows, buckets are redistributed such that no two groups are identical.

In a conventional storage system, the state information may be kept in RAM for quick access, and the storage system may also have uninterruptible power supplies (UPSs) to temporarily provide power to the storage system in the event of a power failure.

In case of power failure, the storage system may get a notification from the UPS, and then stop serving I/O requests. The storage system may be able to quickly save the RAM contents to NVM, which may be, for example, SSD memory. When power is available again, the storage system may read the stored state data back to memory so that it can continue from the point just before the power failure.

Without such recovery system, file storage systems that don't have UPS protection may take a very long time to run a filesystem check (FSCK) after a power failure. The FSCK may need to be run, for example, when new data is written on top of old data when modifying a file, or if files are truncated. The FSCK process may need to go over all the possible storage capacity to make sure there is nothing that was missed. Reading and verifying the entire storage capacity can take a long time, where the time to run this check may be proportional to the size of the filesystem. It may take days, weeks, and sometimes well over a month to run FSCK for a large capacity filesystem. This may be problematic for many users.

On the other hand, various embodiments of the disclosure may allow for recovery in a short amount of time even without a power failure notification from a UPS. This may be useful for cases such as, for example, when a storage system comprises storage devices that may be a customer's servers or part of a public cloud where the storage management system may not be notified by the UPS at all or in enough time before power is lost to be able to save the state information.

Figure 4A:
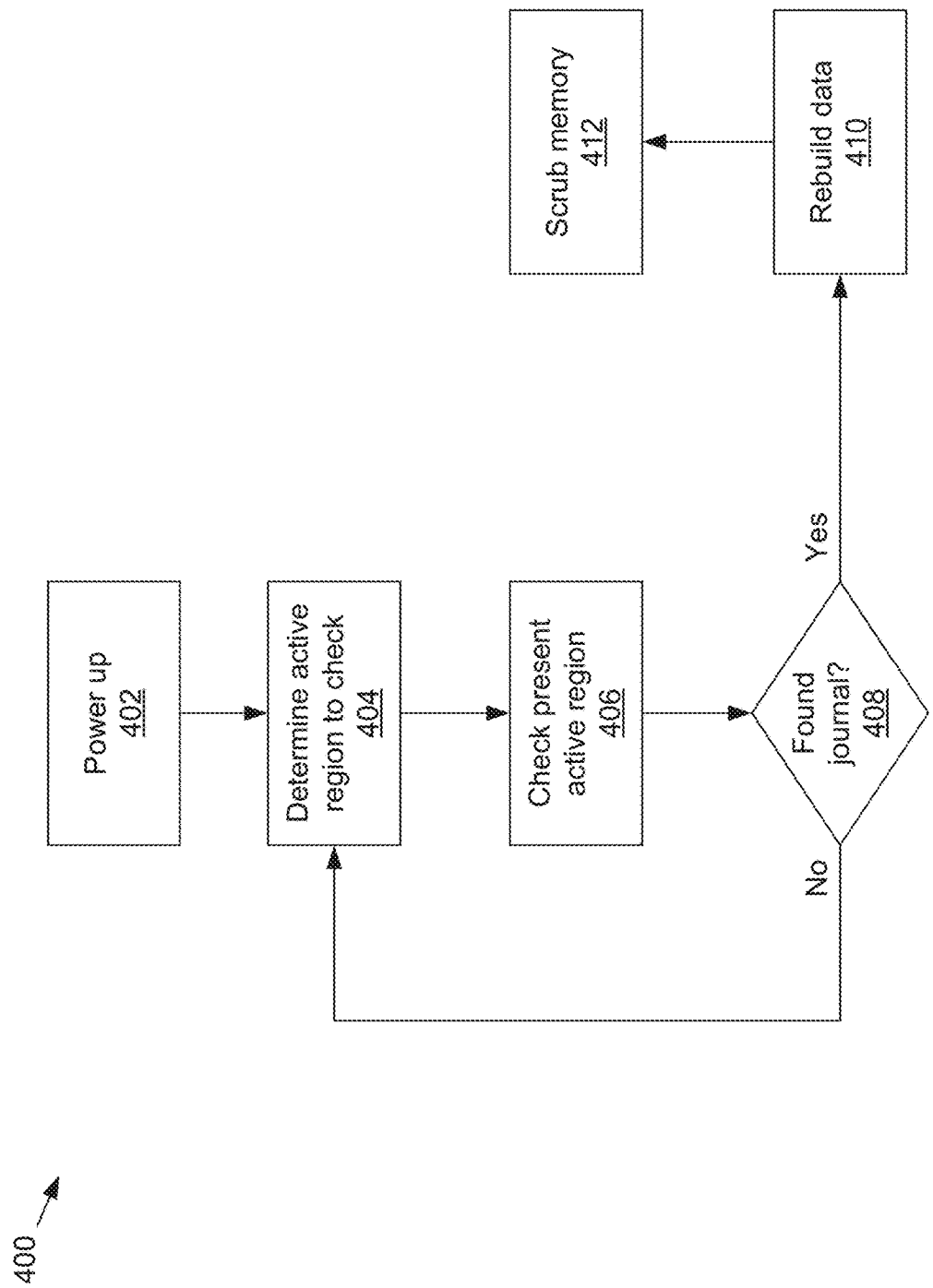
FIG. 4A illustrates a flowchart of an example recovery process after a power failure in accordance with an example implementation of this disclosure.

FIG. 4A illustrates a flowchart of an example recovery process after a power failure in accordance with an example implementation of this disclosure. Referring to FIG. 4A, there is shown an example flowchart 400 for a storage system for searching for a journal for a bucket. At block 402, power up is detected after an unscheduled power down. The unscheduled power down may be due to, for example, a power failure. The unscheduled power down may be noted by, for example, checking a status flag of an NVM. For example, when the storage system powers down normally, the status flag may be set. However, when an unscheduled power down occurs, that status flag will not be set. Other methods may also be used to be able to determine an unscheduled power down. Accordingly, when a power up process commences after power is restored, a processor may check the status flag to see if an unscheduled power down occurred.

At block 404, an active region of the various NVM storage devices (e.g., disks, SSDs, etc.) for one or more buckets may be identified to search for a journal. For the sake of convenience, the NVM storage devices may be assumed to be SSDs. However, it should be realized that an NVM may be any other type of memory suitable for a particular storage needs.

Unlike conventional systems, various embodiments of the disclosure may integrate the file system with a protection mechanism. Accordingly, the filesystem may control where new data is written. Additionally, since all new writes are to new stripes, even when existing data is modified, current storage locations may not be modified by new data. Therefore, it can be seen that the active region that needs to be checked for the journal may be relatively small compared to the storage space for which the corresponding journal is being sought.

On each server, or each SSD on each server, there may be a known active range of SSDs to which new stripes may be written. Accordingly, since the storage system knows where the active region(s) is (are) on each SSD, during a boot process after a power failure, only the active region may be read to look for a journal, for example, or to examine the latest writes and metadata changes. Therefore, a vast majority of the storage capacity may not need to be read and verified. Rather, description of file modifications, additions, etc., may be stored on the relatively small "active" portions of the SSDs.

At block 406, the present active region may be searched. At block 408, if a journal is not found, then a next active region to be searched may be determined at block 404. If a journal is found, then the process of rebuilding data may start at block 410.

Once the journal and its related metadata have been read, the system may be able to verify the data in the storage devices, and, if needed, may restore the data to the original state. This is described in more detail in the U.S. Application No. 62/585,166.

However, what may be missing may be deleted files or files that may be truncated to smaller sizes that may not be reflected in the metadata. Accordingly, data blocks may not have been accurately marked as being free, as part of a delete operation, or as being truncated. The system may then return online with less reported total capacity than the actual total capacity at the time of the power failure.

Accordingly, after rebuilding data, the rebuilt data may be scrubbed at block 412 to reconcile information regarding the memory size due to misallocated memory. This is explained in more detail with respect to FIG. 4B.

While the flowchart 400 illustrates one example process, various embodiments of the disclosure may use other processes for data recovery after, for example, an unscheduled power down.

Figure 4B:
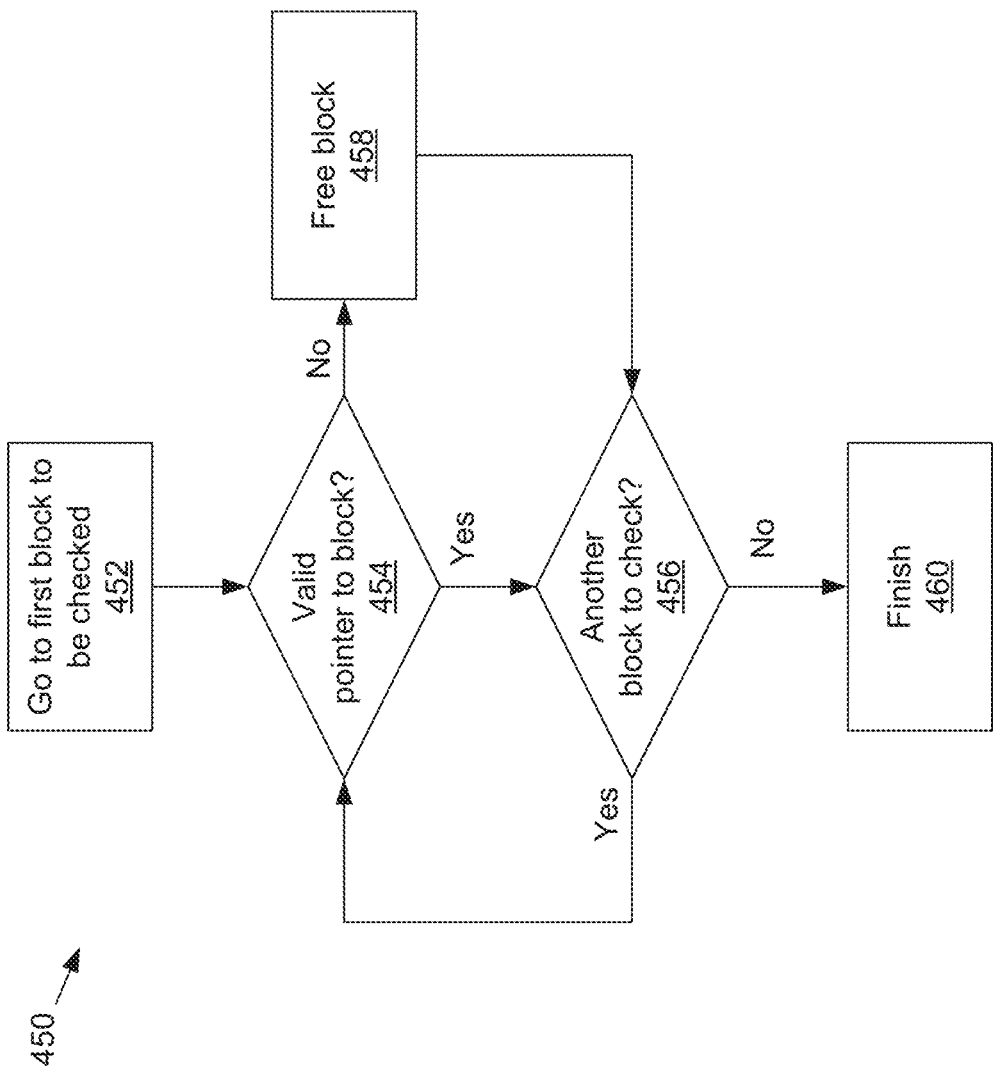
FIG. 4B illustrates a flowchart of an example memory scrubbing process in accordance with an example implementation of this disclosure.

FIG. 4B illustrates a flowchart of an example memory scrubbing process in accordance with an example implementation of this disclosure. Referring to FIG. 4B, there is shown an example flowchart 450 for memory scrubbing. During the scrubbing process, each bucket and DECS may continuously go through all the blocks under its management to ensure that data is intact. Therefore, the scrubbing process may be used to account for silent physical media failures, and also used to validate data storage when recovering from a power failure. If an abnormality is found in a stripe, the storage system may act to find the faulty block and fix it.

At block 452, the scrubbing process may start by going to a first data block to be scrubbed. At block 454, the data block may be checked as to whether it is still pointed to by a file. If so, then that data block is a valid block and the process may continue at block 456. If the data block is not pointed to by any pointer, then the data block may be freed at block 458. Various embodiments of the disclosure may also check the data block for integrity. If there is an error, the error may be fixed. A data block that needs to be freed or fixed may be referred to as an abnormal data block.

Block 456 may determine whether there is another data block that needs to be checked. If so, then the process may return to block 454. If not, the scrubbing process may be finished at block 460.

Accordingly, the storage system may use a scrubbing process to find the deleted blocks and free them. After the first scrubbing process has finished going through the entire storage capacity, the storage system may now have successfully reclaimed all the freed capacity so that the reported free space is accurate. While the scrubbing process may be a lengthy process, this process need not affect the normal handling of I/O requests and can be done, for example, in the background.

Various embodiments of the disclosure may have the scrubbing process take place continuously, while other embodiments of the disclosure may have the scrubbing process take place at intervals. The intervals may be, for example, a period of hours, days, weeks, etc. The intervals may also be, for example, a certain period after the last scrubbing process finished. Various embodiments of the disclosure may also allow the scrubbing process take place on demand, automatically as part of power up after an unscheduled power down and/or other events, etc.

Various embodiments of the disclosure may use different processes than the flowchart illustrated in FIG. 4B. In some embodiments, the memory scrubbing process may also be called explicitly at specific times such as, for example, after data rebuild.

Figure 5:
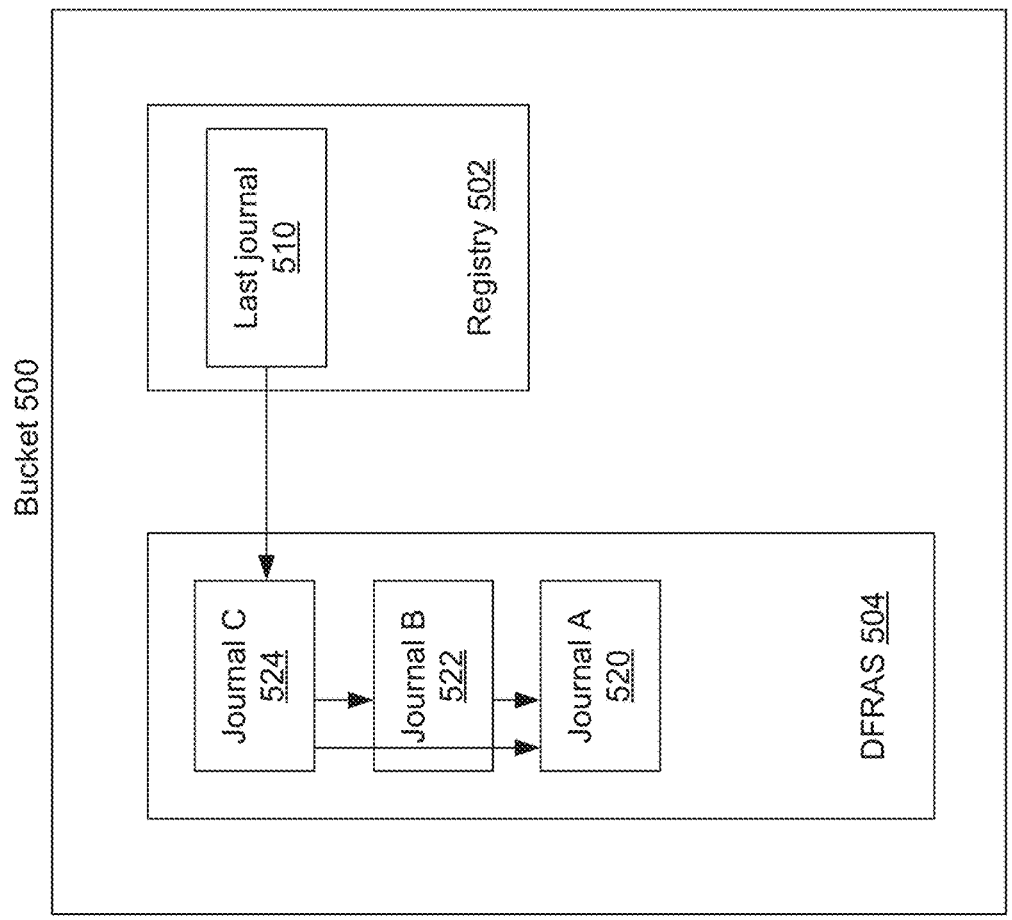
FIG. 5 illustrates an example of journal linking in accordance with an example implementation of this disclosure.

FIG. 5 illustrates an example of journal linking in accordance with an example implementation of this disclosure. Referring to FIG. 5, there is shown a bucket 500 with a registry 502 for metadata and a DFRAS 504. A DFRAS may comprise a linked list of metadata entries for a journal that keep track of higher level operations and ensure their persistence in case of a failure. Each journal entry in, for example, the DFRAS 504 is associated with a DFRAS operation. The journal entries in a DFRAS may be garbage collected when the data associated with those journal entries are destaged (written) to, for example, NVM storage.

As shown in an example organization of FIG. 3, a physical storage is organized into a plurality of distributed failure resilient address spaces (DFRASs) 318, each of which comprises a plurality of chunks 310, which in turn comprises a plurality of blocks 312. Each block 312 stores committed data 316 and/or metadata 314 that describes or references committed data 316.

The registry 502 may hold a journal tail entry 510 that may point to, for example, the previous journal entry 524. The journal entry 524 may hold metadata for a write process as well as pointing to, for example, two previous journal entries 522 and 520. The journal entry 522 may point to the head journal entry 520. The number of previous journal entries pointed to may be design and/or implementation dependent.

As shown in FIG. 5, the bucket 500 has its own journal linked list, and many sets of journals may cooperate over the entire cluster, as each cluster contains a large number of buckets working concurrently. The registry and journal may be combined to provide coherent operations that work well with failover and rebalances. The registry may be the data structure that holds information regarding the storage system. In order to write level the registry, the registry may be written to NVM, for example, every several hundred (or several thousand) operations and the journal may be used in the event of a failure.

Various aspects of the disclosure may provide a method for data recovery in a storage system with a file system that is integrated with a protection layer, comprising detecting power up after a non-scheduled power down, and determining active regions of associated storage devices. Information regarding the active regions may be stored in an appropriate memory storage.

The associated storage devices are part of a same bucket, searching the active regions of the associated storage devices for a journal that corresponds to at least a portion of the associated storage devices, and rebuilding data in the at least a portion of the associated storage devices based on information in the journal.

The method may also comprise, after rebuilding the data, scrubbing memory to identify an abnormal data block. Scrubbing memory may comprise freeing the abnormal data block or fixing an error in the abnormal data block. Scrubbing memory may also occur in the background, and/or may occur continuously. Various embodiments may also provide scrubbing memory on demand.

Various aspects of the disclosure may provide a system for data recovery in a storage system with a file system that is integrated with a protection layer, where the system may comprise a processor configured to detect power up after a non-scheduled power down, and determine active regions of associated storage devices, wherein the associated storage devices are part of a same bucket. The processor may determine the active regions by reading information regarding the active regions stored in memory.

The processor may be configured to search the active regions of the associated storage devices for a journal that corresponds to at least a portion of the associated storage devices and rebuild data in the at least a portion of the associated storage devices based on information in the journal.

The processor may be configured to, after rebuilding data, scrub memory to identify an abnormal data block, and then free the abnormal block or fix an error in the abnormal block.

In various embodiments, the processor may scrub memory in the background. Scrubbing memory may occur continuously. Scrubbing memory may occur on demand.

Various aspects of the disclosure may provide a machine-readable storage having stored thereon, a computer program having at least one code section for data recovery in a storage system with a file system that is integrated with a protection layer, the at least one code section comprising machine executable instructions for causing the machine to perform steps comprising detecting power up after a non-scheduled power down, and determining active regions of associated storage devices, wherein the associated storage devices are part of a same bucket. The information regarding the active regions may be stored in appropriate memory locations.

The machine-readable storage may comprise executable instructions, when executed, may cause searching the active regions of the associated storage devices for a journal that corresponds to at least a portion of the associated storage devices, and rebuilding data in the at least a portion of the associated storage devices based on information in the journal.

The machine-readable storage may comprise executable instructions, when executed, after rebuilding data, that may cause scrubbing memory to identify an abnormal data block to perform one of: freeing the abnormal data block and fixing an error in the abnormal data block.

The machine-readable storage may comprise executable instructions, which when executed, may cause the process of scrubbing memory to perform one or more of executing in the background, executing continuously, and executing on demand.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise first "circuitry" when executing a first one or more lines of code and may comprise second "circuitry" when executing a second one or more lines of code. As utilized herein, "and/or" means any one or more of the items in the list joined by "and/or." As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g." and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

What is claimed is:

1. A method for data recovery, the method comprising:
   detecting power up after a non-scheduled power down;
   determining active regions of a plurality of storage devices; and
   rebuilding data in a stripe in the active regions according to a journal, wherein:
   the journal is located in the active regions of the plurality of storage devices,
   the plurality of storage devices comprise a plurality of groups of storage devices,
   each bucket of a plurality of buckets owns an address space,
   each bucket is operable to write to its own address space,
   each address space extends over a group of storage devices,
   no two buckets are operable to store into a same address space,
   no two address spaces extend over the same group of storage devices, and
   no two groups of storage devices are identical.

2. The method of claim 1, comprising scrubbing the stripe to identify an abnormal data block.

3. The method of claim 2, wherein scrubbing comprises freeing the abnormal data block.

4. The method of claim 2, wherein scrubbing comprises fixing an error in the abnormal data block.

5. The method of claim 2, wherein scrubbing occurs in a background.

6. The method of claim 2, wherein scrubbing occurs continuously.

7. The method of claim 2, wherein scrubbing occurs on demand.

8. The method of claim 1, wherein information regarding the active regions is stored in nonvolatile memory.

9. A system for data recovery, the system comprising:
   a processor configured to:
   detect power up after a non-scheduled power down;
   determine active regions of a plurality of storage devices; and
   rebuild data in a stripe in the active regions according to a journal, wherein:
   the journal is located in the active regions of the plurality of storage devices,
   the plurality of storage devices comprise a plurality of groups of storage devices,
   each bucket of a plurality of buckets owns an address space,
   each bucket is operable to write to its own address space,
   each address space extends over a group of storage devices,
   no two buckets are operable to store into a same address space,
   no two address spaces extend over the same group of storage devices, and
   no two groups of storage devices are identical.

10. The system of claim 9, wherein the processor is configured to, after rebuilding the data, scrub memory of the stripe to identify an abnormal data block.

11. The system of claim 10, wherein scrubbing memory comprises freeing the abnormal data block.

12. The system of claim 10, wherein scrubbing memory comprises fixing an error in the abnormal data block.

13. The system of claim 10, wherein scrubbing memory occurs in a background.

14. The system of claim 10, wherein scrubbing memory occurs continuously.

15. The system of claim 10, wherein scrubbing memory occurs on demand.

16. The system of claim 9, wherein the processor is configured to read information regarding the active regions from nonvolatile memory.

17. A non-transitory machine-readable storage having stored thereon, a computer program having at least one code section for data recovery in a storage system with a file system that is integrated with a protection layer, the at least one code section comprising machine executable instructions for causing a machine to perform steps comprising:
  detecting power up after a non-scheduled power down;
  determining active regions of a plurality of storage devices; and
  rebuilding data in a stripe in the active regions according to a journal, wherein:
    the journal is located in the active regions of the plurality of storage devices,
    the plurality of storage devices comprise a plurality of groups of storage devices,
    each bucket of a plurality of buckets owns an address space,
    each bucket is operable to write to its own address space,
    each address space extends over a group of storage devices,
    no two buckets are operable to store into a same address space,
    no two address spaces extend over the same group of storage devices, and
    no two groups of storage devices are identical.

18. The non-transitory machine-readable storage of claim 17, comprising machine executable instructions for, after rebuilding the data, scrubbing memory to identify an abnormal data block to perform one of: freeing the abnormal data block and fixing an error in the abnormal data block.

19. The non-transitory machine-readable storage of claim 18, wherein scrubbing memory comprises one or more of: executing in a background, executing continuously, and executing on demand.

20. The non-transitory machine-readable storage of 17, wherein information regarding the active regions are is stored in a memory.

\* \* \* \* \*